(No Model.)

W. H. THOMPSON.
ANT TRAP.

No. 331,099. Patented Nov. 24, 1885.

WITNESSES:
F. McArdle
C. Sedgwick

INVENTOR:
W. H. Thompson
BY Munn & Co
ATTORNEYS.

UNITED STATES PATENT OFFICE.

WILLIAM H. THOMPSON, OF LULING, TEXAS.

ANT-TRAP.

SPECIFICATION forming part of Letters Patent No. 331,099, dated November 24, 1885.

Application filed September 1, 1885. Serial No. 175,924. (No model.)

*To all whom it may concern:*

Be it known that I, WILLIAM HENDERSON THOMPSON, of Luling, in the county of Caldwell and State of Texas, have invented a new and Improved Ant-Trap, of which the following is a full, clear, and exact description.

My invention relates to the construction of an apparatus for catching and killing ants; and the invention consists of certain details of construction and combinations of parts, as will be hereinafter described, and specifically pointed out in the claims.

Reference is to be had to the accompanying drawings, forming part of this specification, in which similar letters of reference indicate corresponding parts in all the figures.

Figure 1:
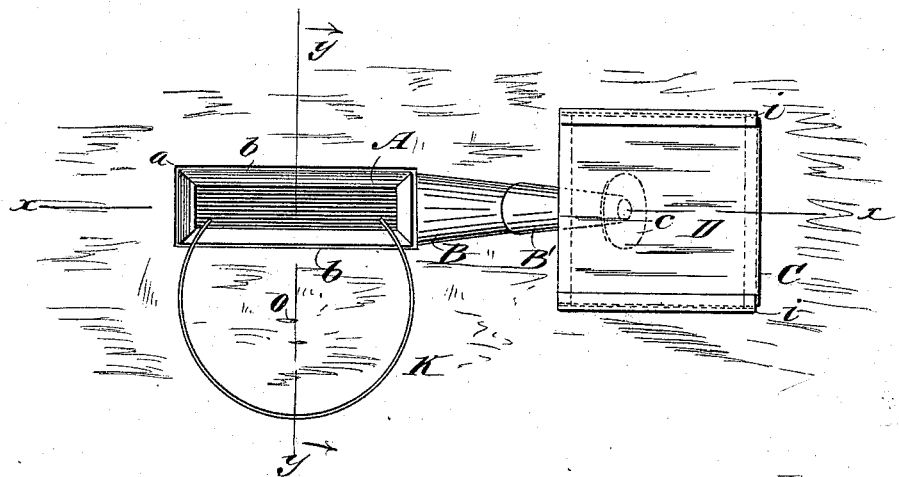
Figure 2:
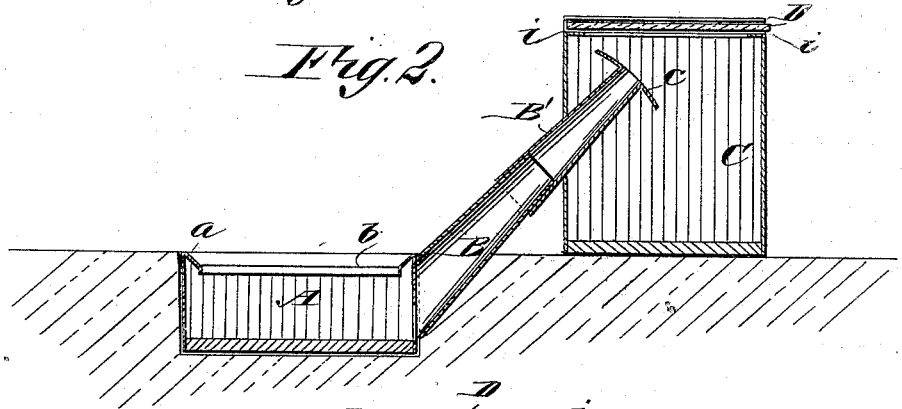
Figure 3:
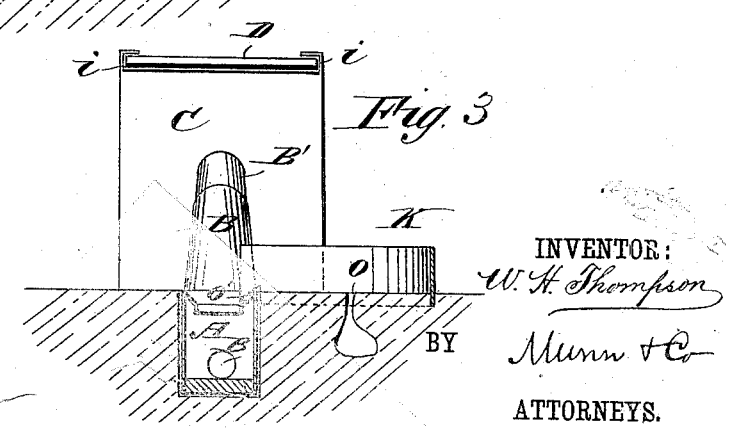

Figure 1 is a plan view of my improved ant-trap, which is represented as being placed in position for use. Fig. 2 is a vertical sectional elevation of the same, taken on line $x\ x$ of Fig. 1; and Fig. 3 is a sectional view of the apparatus, taken on line $y\ y$ of Fig. 1.

The trap consists of a trough, A, that is embedded in the ground, so that its top $a$ is on a level therewith. The tin or other metal of which the trough is made is bent inward around the top so as to form a flange, $b$. From one end of the trough A there projects a tube, B, arranged to couple with a tube, B', that projects through the side of a box, C, and carries a concavo-convex disk, $c$, upon its inner and upper end, as best shown in Fig. 2. The cover D of the box C is formed from a rectangular piece of glass, which rests in ways $i\ i$, and is removable.

In placing my trap a location is selected at a proper distance from the hill, the ground is dug up, and the trough A placed therein, so that its top $a$ will be on a level with the surface of the ground, the tube B projecting, as shown, to engage with the tube B' of the box C. When the parts are arranged as described, the ant-hole shown at $o$ is encircled by a fence, K, formed from a strip of tin or other metal, the ends $o'\ o'$ of which are notched to fit the flanged top of the trough A. The ants, coming out of the hole $o$, will walk around the inner side of the fence K until they drop into the trough A, and from there will run up the tubes B B' into the box C. Now, as the top or cover of the box C is glass, the sun will have its full effect upon the contents of the box, and upon a hot day will very soon kill the ants contained therein.

This trap is simple, cheap, and durable, and the ants, having once entered it, cannot get out, as they can from so many of the old forms of ant-traps.

Having thus described my invention, what I claim as new, and desire to secure by Letters Patent, is—

1. In an ant-trap, the combination, with a trough, of a box connected thereto by a tube terminating in a disk, $c$, substantially as described.

2. In an ant-trap, the combination, with a trough formed with a top flanged at $b$, of the connecting-tubes B B', box C, and fence K, substantially as described.

WILLIAM H. THOMPSON.

Witnesses:
J. H. MUENSTER,
C. H. BROWNE.